(12) United States Patent
Veziris

(10) Patent No.: US 6,873,253 B2
(45) Date of Patent: Mar. 29, 2005

(54) DEVICE FOR WARNING DRIVERS OF AUTOMOBILES OF EXCESSIVE SPEED OF TURNING AROUND A CURVE

(76) Inventor: Spyros Veziris, Fragoklisias 34, 151 25 Amarousion (GR)

( * ) Notice: Subject to any disclaimer, the term of this patent is extended or adjusted under 35 U.S.C. 154(b) by 142 days.

(21) Appl. No.: 10/270,438

(22) Filed: Oct. 15, 2002

(65) Prior Publication Data

US 2004/0070493 A1 Apr. 15, 2004

Related U.S. Application Data

(63) Continuation of application No. PCT/GR01/00020, filed on Apr. 12, 2001.

(30) Foreign Application Priority Data

Apr. 14, 2000 (GR) ..................... 20000100129

(51) Int. Cl.[7] .............................. D60Q 1/00
(52) U.S. Cl. ................ 340/441; 340/438; 340/439; 340/440; 340/689; 33/366.27; 180/172; 180/282; 200/61.45 R; 200/61.52; 701/38
(58) Field of Search ............... 340/441, 440, 340/438, 439, 689, 686.2, 690; 180/172, 171, 170, 197, 199, 41, 271, 282; 200/61.45 R, 61.47, 61.52, 52 A; 33/366.27; 701/38

(56) References Cited

U.S. PATENT DOCUMENTS

| 3,778,763 | A | | 12/1973 | Johns et al. | |
|---|---|---|---|---|---|
| 4,592,565 | A | | 6/1986 | Eagle | |
| 4,658,508 | A | * | 4/1987 | Oberg | 340/440 |
| 4,853,675 | A | * | 8/1989 | Foster | 340/429 |
| 4,952,908 | A | | 8/1990 | Sanner | |
| 5,434,559 | A | * | 7/1995 | Smiley et al. | 340/689 |
| 5,529,153 | A | | 6/1996 | Smith | |
| 5,841,345 | A | * | 11/1998 | Kestenberg | 340/440 |
| 6,130,608 | A | * | 10/2000 | McKeown et al. | 340/438 |
| 6,397,133 | B1 | * | 5/2002 | van der Pol et al. | 340/440 |
| 6,571,481 | B1 | * | 6/2003 | Weiss | 340/442 |

FOREIGN PATENT DOCUMENTS

| DE | 34 34 689 | 4/1986 |
|---|---|---|
| DE | 43 42 732 | 6/1995 |
| SU | 816849 | 5/1979 |
| WO | WO-99/37520 | 7/1999 |

* cited by examiner

Primary Examiner—Davetta W. Goins

(57) ABSTRACT

An autonomous device for warning drivers of automobiles of excessive speed of turning around a curve. The device is compact with both the sensing means and alarm audio and/or visual signal producing means. The sensing means comprises two, alternatively activated and differentially calibrated by means of a proposed calibration device, pair of mercury switches, each pair comprising two oppositely inclined mercury switches for monitoring right and left turns of the vehicle, wherein the first pair is adapted for use in conditions of dry road surface by calibration at a predetermined value of inclination and a second pair is adapted for use in conditions of wet road surface by calibration at a different predetermined value of inclination.

7 Claims, 4 Drawing Sheets

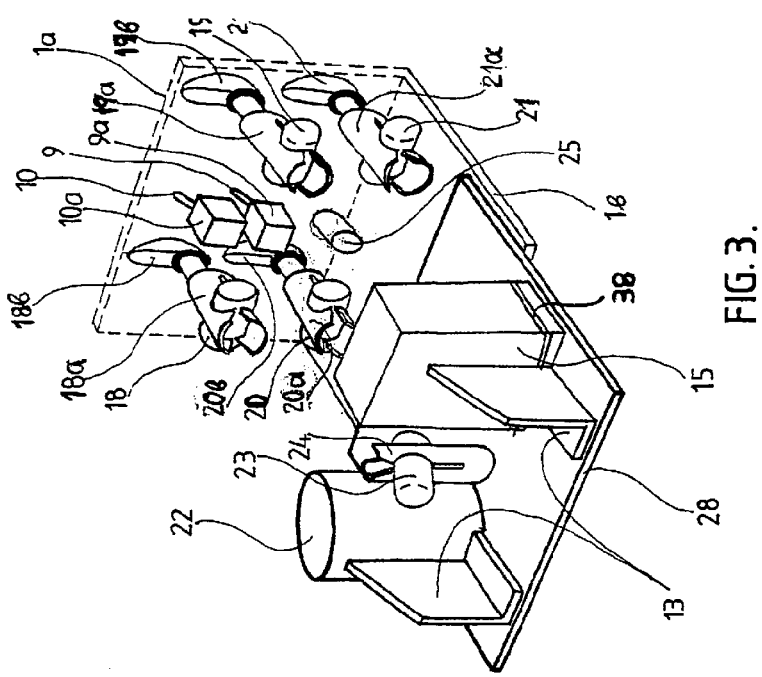
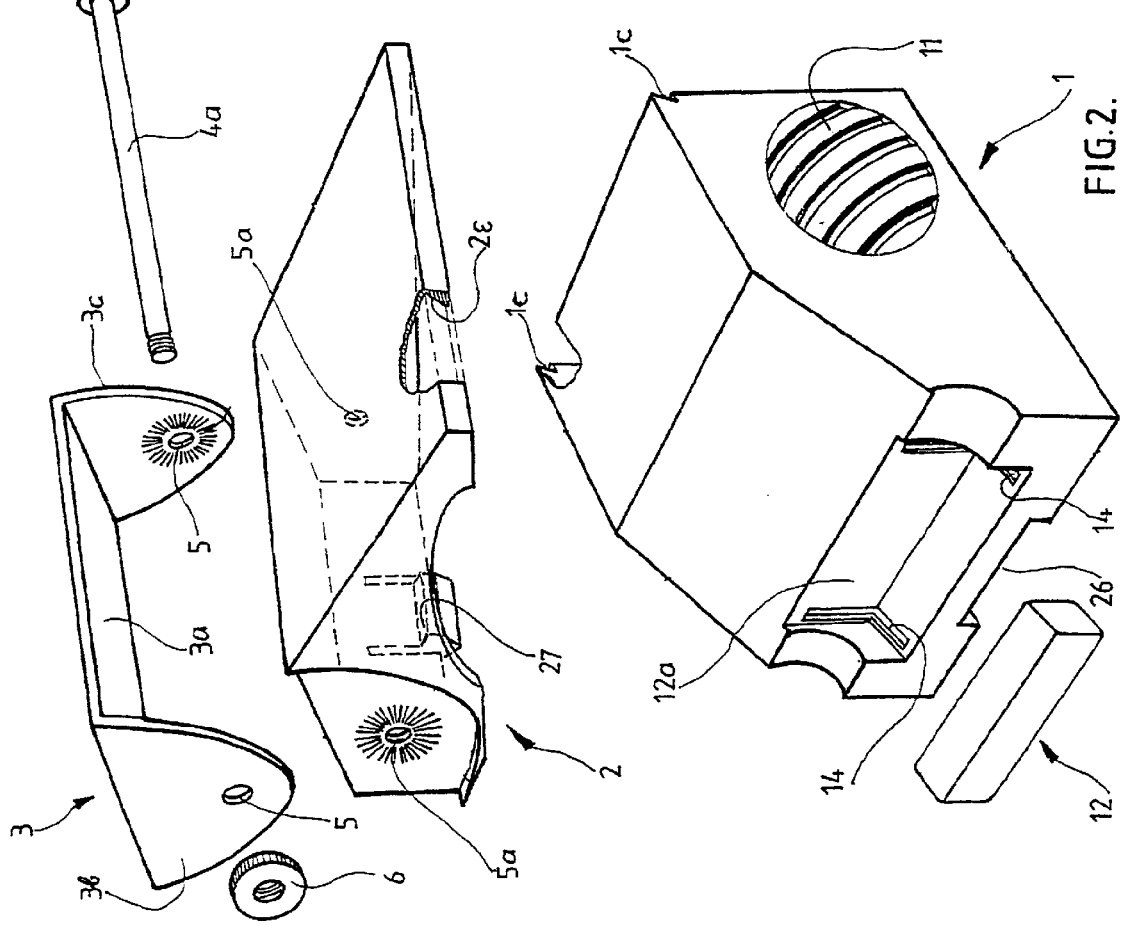

DEVICE FOR WARNING DRIVERS OF AUTOMOBILES OF EXCESSIVE SPEED OF TURNING AROUND A CURVE

This is a continuation of application No. PCT/GR01/00020, filed on Apr. 12, 2001.

FIELD OF THE INVENTION

The present invention relates generally to the art of automobile vehicles and more particularly to an autonomous, compact device which may be calibrated and adjust to alternative road conditions and which emits an audio and/or visual signal for warning the driver of the vehicle of excessive speed of turning around a curve, so that he may timely and securely react and adjust the speed of the vehicle within safe limits, thereby avoiding possible overturning of the vehicle.

BACKGROUND OF THE INVENTION

When a vehicle moves around a curve, it becomes subject to a possibility of skidding or overturning, depending on a variety of conditions, such as, first of all the speed of the vehicle, which is the main and only parameter that can be changed by the driver of the vehicle if he gets a timely warning that this parameter tends to exceed safe limits. As known from physics, the centrifugal force, which is the cause for the development of an overturning moment, is dependent on the square of the speed of the vehicle. It is also dependent on the radius of curvature, the slope of the road surface and the combination of road and weather conditions.

The possibility that a vehicle moves in a succession of right and left turns, which leads to alternative compression and decompression of the shock absorbers of the vehicle's suspension system further enhances possibilities of overturning, but also of the driver loosing control of the vehicle.

Prior art approaches to alleviation of the problem of monitoring an impeding overturning condition when the vehicle moves around a curve generally related to sensor means which, when an alarm condition was monitored, activated automatic operations, such as effecting reduction of available power or even shutting off the motor of the vehicle without any action being taken by the driver. An example of such a device is described by Lengd. Agric. Inst. in SU-816849.

The above approach is however considered inappropriate for experienced drivers, who dislike leaving control of their car to automatically activated systems. Moreover such automatically activated systems are highly complicated and costly.

The alternative prior art approaches relate to devices that aim at providing a warning to the driver of the vehicle, so that he may take remedial measures. Such devices as by way of example disclosed by Anton Ellinghaus in DE-4342732 or by J. A. Sanner in U.S. Pat. No. 4,952,908 relate to tractor-trailer vehicles, wherein the device is split in two parts, one sensing means mounted on the trailer and coupled to alarm means mounted on the tractor. The above sensing means in U.S. Pat. No. 4,952,908 is proposed to include a pair of angular mounted normally open mercury switches arranged to detect lateral forces to the right or left to a degree conducive to roll-over. The device proposed by Johns et al in U.S. Pat. No. 3,778,763 is also split in two parts, wherein one part is the sensing means and the other part the means for emitting a visual or audible alarm, positioned in the drive compartment of the vehicle. The sensing means in Johns et al also employs a mercury switch sensing device, having a U shaped mercury structure, which senses tilting movements of the vehicle.

Whilst the above devices are aimed to activating the driver in taking remedial measures, so as to return the vehicle in safe course, they are powered by the battery of the vehicle and they become unreliable due to their split configuration and therefore the need of transferring the signal from the sensing means to the means for emitting a visual and/or audible alarm.

Furthermore, none of the devices of the prior art, which operate so as to provide a warning to the driver of the vehicle and leave to him taking the remedial measures, includes appropriate means for calibration of the sensing device, so that a single make of the device may be adjusted into the combination of performance characteristics of different motor cars and into the particular driving habits and skills of individual drivers. It therefore follows that due to varying vehicle performance characteristics and driving habits of individual drivers, devices of the prior art may fail in producing a timely warning, appropriate to the above mentioned changing conditions.

Devices of the prior art also fail to provide means for adjusting the operation thereof to changing operating conditions, and in particular to changing road conditions as such conditions arise in the variation between dry and wet road surface.

The object of the present invention is to effectively overcome the abovementioned shortcomings of the prior art by providing a device for warning drivers of automobiles of excessive speed of turning around a curve, so that they may be alerted in taking remedial measures, wherein the device is characterized by being autonomous, compact and self powered, achieving low cost and trouble free reliable operation, wherein sensing of excessive speed in right or left turns is being monitored by a first pair of oppositely inclined mercury switches.

Another object of the invention is to propose the device with means for adjusting the operation thereof to changing operating conditions in dry or wet road surface, this means being an additional, accordingly calibrated second pair of oppositely inclined mercury switches, wherein in use the device may be alternatively set to operate with either the above mentioned first or second pair of oppositely inclined mercury switches, so as to appropriately adjust to operation in dry or wet road surface.

Another object of the invention is to propose a device with varying response sensitivity and calibrating means of the sensing device, so that it may be adjusted into the combination of varying performance characteristics of different motor cars and into the varying particular driving habits and skills of individual drivers.

Still a further object of the invention is to provide for the device to be alternatively mounted onto the driving panel or embodied into a suitable location thereof or mounted onto the windscreen, wherein the device is advantageously provided with a housing divided in portions, so that it may be fixedly mounted, whilst assuming the desired horizontal orientation.

BRIEF DESCRIPTION OF THE DRAWINGS

The invention will now be described by reference to the accompanying drawings, wherein it is being described by means of preferred illustrative embodiments.

FIG. 1 slows a perspective view of the ready to use device of the invention.

FIG. 2 shows a perspective view of the independent portions of the housing of the device of the invention.

FIG. 3 shows a perspective view of the interior of the device and the parts thereof.

DETAILED DESCRIPTION OF PREFERRED EMBODIMENTS

Figure 1:
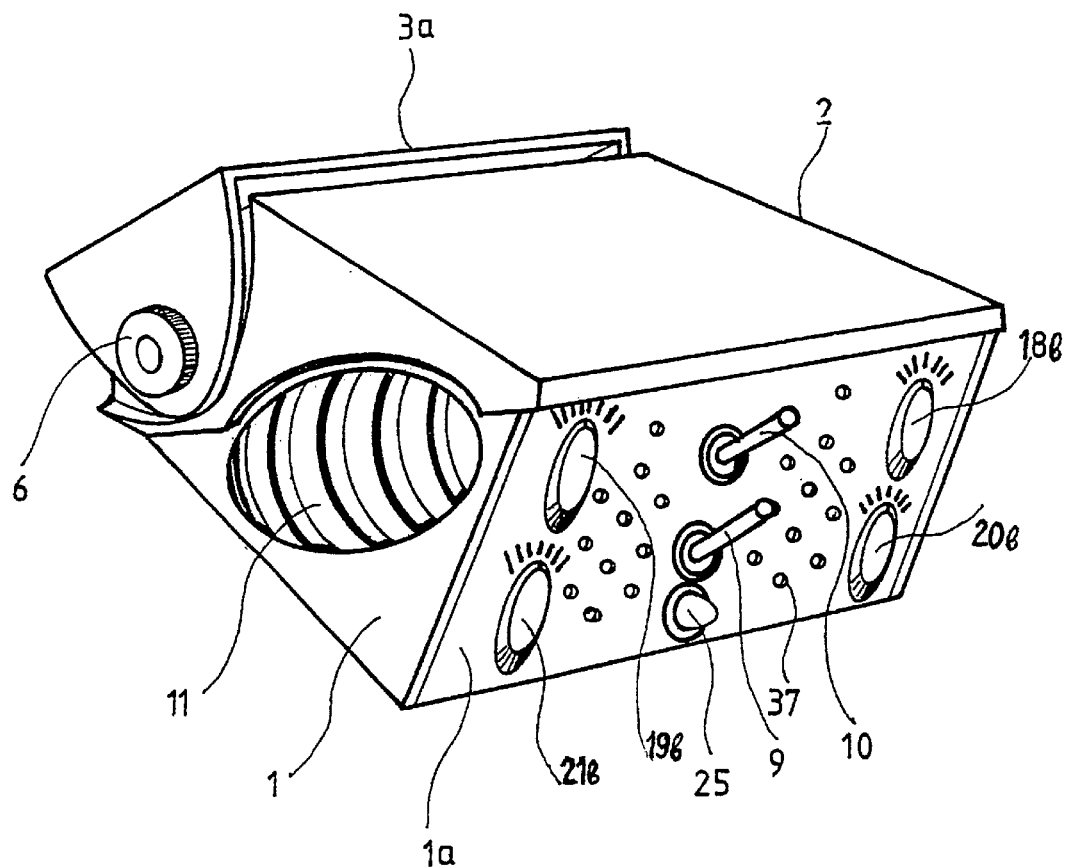

In accordance to a preferred embodiment, the operating panel of the device of the invention is a rectangular frontal panel surface $1a$ which constitutes the frontal view of the device and extends to a perpendicularly projecting basement $1b$ of the housing of the device. The frontal surface $1a$ is provided with a plurality of holes 37 allowing transmission of the sound of alarm emitted from the interior of the device.

The arrangement of the device used for sensing possible excessive speed of turning around a curve comprises a first pair of mercury switches 18, 19 and a second pair of mercury switches 20,21. Each one of the abovementioned switches comprises a cylindrical tube within which is freely reciprocatingly moving a mercury bulb. This cylindrical tube is mounted within a lateral cavity of a cylindrical carrier means $18a$, $19a$, $20a$ and $21a$ respectively. Whilst the abovementioned mercury switches and corresponding carrier means are mounted onto the rear surface of the frontal panel surface $1a$, each of the carrier means extends into a rotatable Knob $18b$, $19b$, $20b$ and $21b$ respectively on the frontal panel surface $1a$. Knobs $18b$, $19b$, $20b$ and $21b$ are used in the calibration procedure of the device, during which each knob and corresponding carrier means is rotated so as to bring each corresponding mercury switch to a desired inclination, so as to define response sensitivity of the device, i.e. to define the conditions under which the speed of the vehicle is considered excessive and beyond the safe limits when the vehicle is about to turn around a curve.

Whilst mercury switches 18 and 20 located on the one side of the frontal panel surface $1a$ are inclined in one direction, so as to monitor right turns of the vehicle, by corresponding rotation of knobs $18b$ and $20b$ in a clockwise direction, mercury switches 19 and 21 located on the other side of the frontal panel surface $1a$ are inclined in the opposite direction, so as to monitor left turns of the vehicle, by corresponding rotation of knobs $19b$ and $21b$ in an anticlockwise direction.

The first abovementioned pair of mercury switches 18 and 19 are selected to operate in conditions of dry road surfaces, whilst the second abovementioned pair of mercury switches 20,21 are alternatively selected to operate in conditions of wet road surfaces. In this respect, it is evident that the abovementioned two pairs of mercury switches are differentially calibrated by being rotated to differentiated inclinations, corresponding to differentiated response sensitivity for driving in conditions of dry or wet road surfaces.

Such alternative activation of the first or second abovementioned pair of mercury switches is in accordance to a preferred embodiment of the invention implemented by means of a manually operated switch with an operation lever 9 on the frontal panel surface $1a$ and a switch box $9a$ at the rear of the frontal panel surface $1a$. However, in accordance to an alternative preferred embodiment of the invention such alternative activation of the first or second abovementioned pair of mercury switches may be effected automatically upon changing of the conditions of the road surface, by way of example in response to activation of the windscreen wipers.

In accordance to a preferred embodiment of the invention, the frontal panel surface $1a$ is additionally provided with a switch lever 10 corresponding to a switch box $10a$ at the rear of the frontal panel surface $1a$. The switch lever 10 is used to desirably set the device on or off. An indicator lamp 25 is also preferably mounted onto the frontal panel surface $1a$ to provide a visual signal of the warning device.

Figure 4:
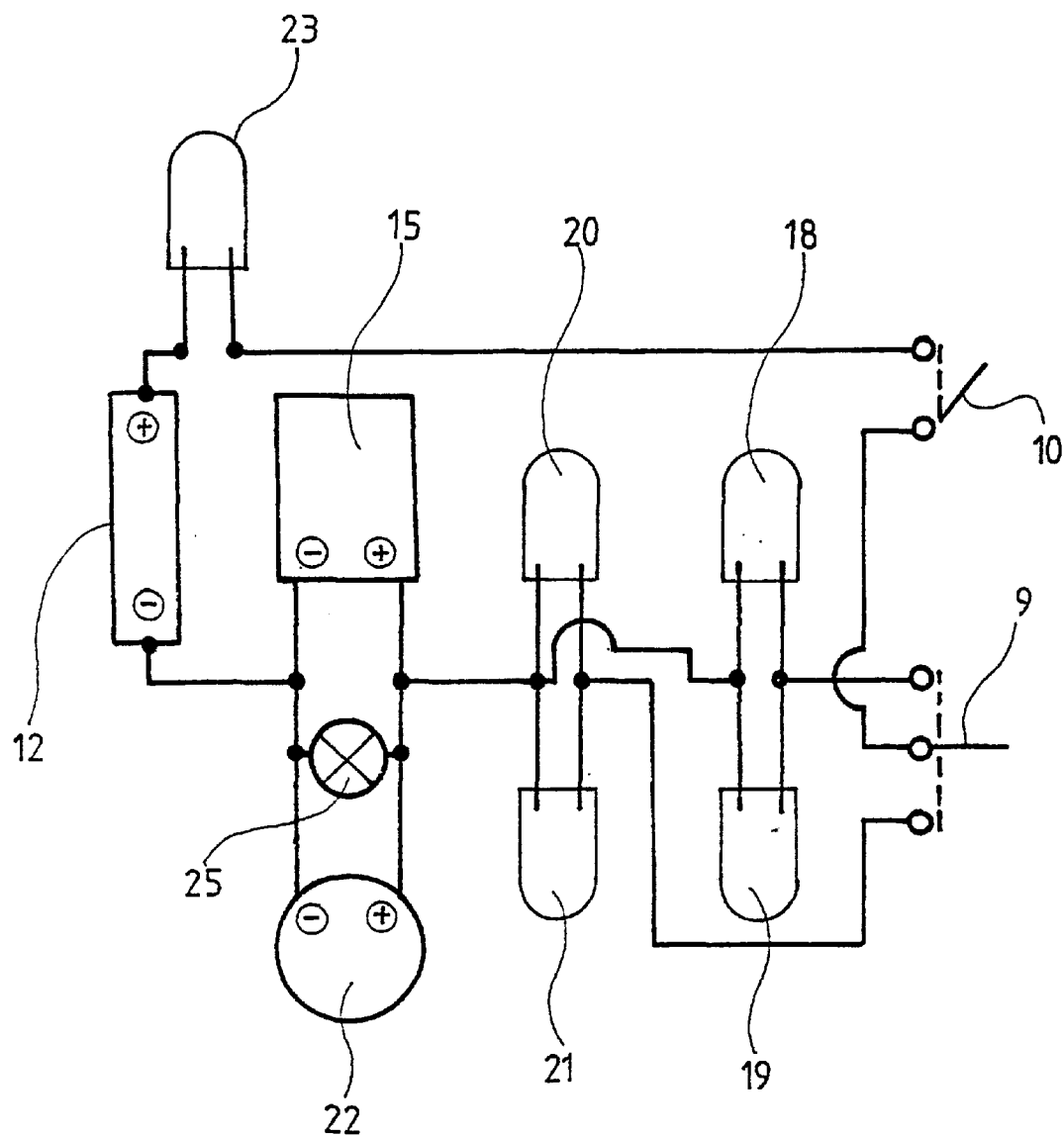
FIG. 4 shows a preferred configuration for the electric circuit selected for the operation of the device.

As shown in FIG. 3, the device of the invention includes a rectangular basement 28 onto which are mounted and appropriately wired on the bottom of the basement 28, so as to operate in accordance with the electrical diagram of FIG. 4, the alarm audio signal producing buzzer means 15, which sits upon a vibration absorbing elastic plate 38, a capacitor 22 and a mercury switch 23 mounted upon a vertically oriented cylindrical carrier 24 adapted to operate so as to cut off possible activation of anyone of the mercury switches of the sensing means of the invention, in response to erroneous sensing of bumps or holes in the road. Opposing conductive plates 13 are also provided onto basement 28 adapted to receive the battery 12 providing the energy supply of the device.

One of the advantageous characteristics of the invention is that it includes appropriate means for calibration of the sensing device, so that it may be adjusted into the combination of performance characteristics of different vehicles and into the particular driving habits and skills of individual drivers.

Figure 5:
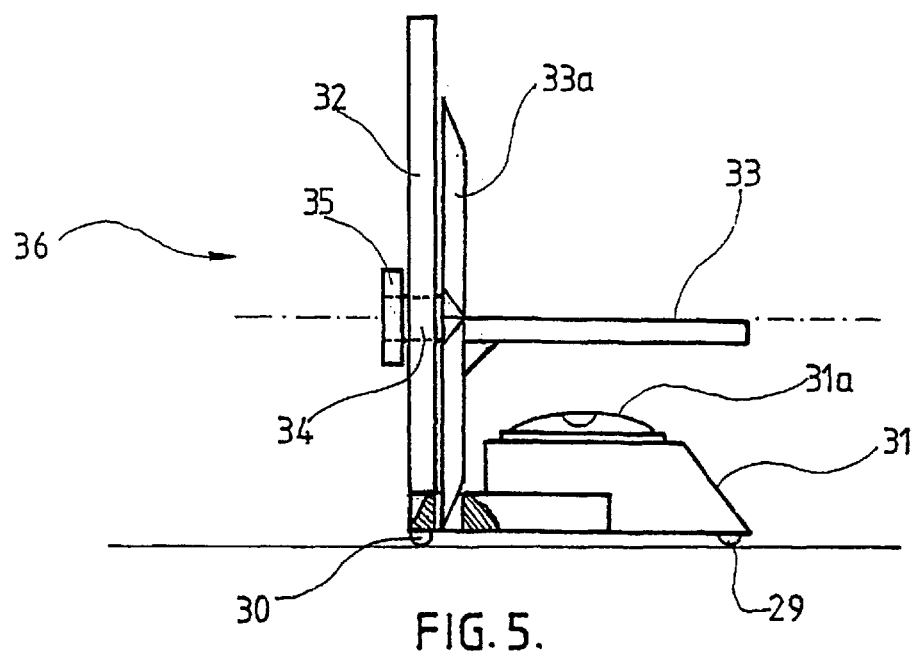
FIG. 5 shows a side view of the calibrating device used in regulating the mercury switches of the device to varying response sensitivity.
Figure 6:
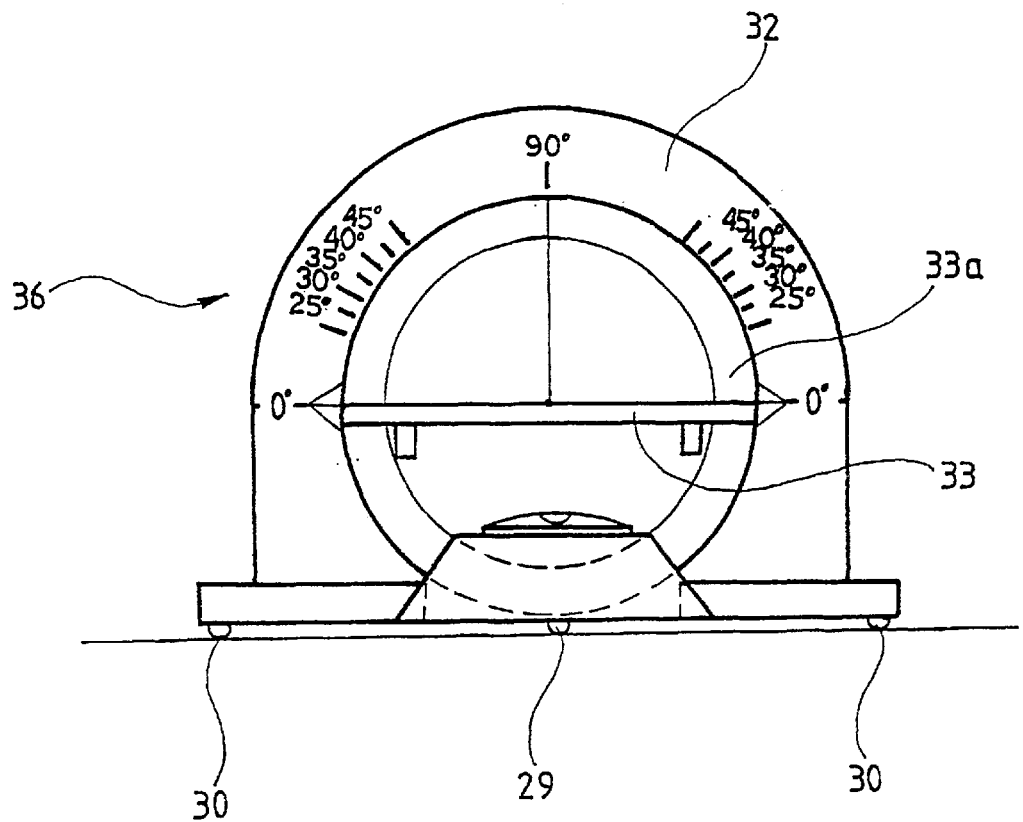
FIG. 6 shows a frontal view of the calibrating device depicted in FIG. 5.

In accordance to a preferred embodiment of the invention, calibration is effected by means of the calibration device 36 depicted in FIGS. 5 and 6, which comprises a vertically oriented surface 32 adapted to receive a circularly marked scale $33a$ of degrees. A table 33 whereupon is mounted the device to be calibrated extends perpendicularly from the vertically oriented surface 32, the table 33 being fixedly mounted onto surface 32 by means of bolt and nut assembly 34, 35. A leveling means $31a$ located onto a body 31 extends, at the bottom of the vertically oriented surface 32, so that the device 36 may be mounted by means of a pair of legs 30 at the bottom of surface 32 and of a leg 29 provided at the bottom of body 31 of the leveling means $31a$, these legs being adjustable to obtain optimum level mounting of the calibration device, so as to perform accurate calibration of the device mounted onto the table 33.

When the device of the invention is mounted onto table 33 of the calibration device, the response sensitivity of each one of the abovementioned first and second pairs of mercury switches is adjusted by choosing a corresponding suitable inclination for each one of the mercury switches within an illustrative range of 25°–45°, such as to correspond to the combination of performance characteristics of different motor cars and into the particular driving habits and skills of individual drivers.

The proposed device with the scope of being mounted onto the windscreen of various motor car makes whilst maintaining a desired horizontal orientation, comprises a housing which is split into three independent portions. As shown in FIG. 2, the housing comprises a main portion 1 with a generally rectangular configuration, which is suitably shaped to cover the basement 28 bearing the electrical components of the device, portion 1 being closed with the frontal panel surface 1*a* and its perpendicularly projecting basement 1*b*. The main portion 1 of the housing of the invention further comprises a rear cavity 12*a* with openings 14 on either end thereof, wherein the opposing conductive plates 13 of the battery 12 of the device protrude through the abovementioned openings 14 and the battery 12 sits within this rear cavity 12*a*, its two poles being in contact with the conductive plates 13. Ventilation holes 11 are also provided on the side surfaces of the main portion 1 of the housing.

In accordance to a preferred embodiment, the device of the invention may be alternatively mounted onto the driving panel and even embodied into a suitable location thereof or mounted onto the windscreen. In the latter case, the device further includes a suspension means portion 2 of the main portion 1 of the housing, the configuration of the suspension means 2 being such as to grip the main portion 1 of the housing and lock onto the same through engagement of an angular front end surface 2*a* and a rear hook 27 thereof onto corresponding angular recessions 1*c* on the front surface and recession 26 on the rear bottom surface of the main portion 1 of the housing.

Finally a third housing portion 3 is used in mounting the device onto a suitable location of the vehicle's windscreen. In accordance with an illustrative preferred embodiment, the third housing portion 3 comprises a flat surface 3*a* with a length corresponding to the width of above-mentioned suspension means portion 2 and a pair of parallel oriented side surfaces 3*b*, 3*c* projecting perpendicularly from the ends of the flat surface 3*a* and having longitudinally aligned, opposing holes 5. The third housing portion 3 is rotatably connected to the suspension means portion 2, when the abovementioned parallel oriented side surfaces 3*b*, 3*c* thereof come in contact with parallel opposing side surfaces of the suspension means portion 2, which are provided with accordingly longitudinally aligned holes 5*a*. As holes 5*a* of the suspension means portion 2 coincide with holes 5 of the abovementioned third housing portion 3, a shaft 4*a* with a threaded end is longitudinally inserted along these coincident holes 5, 5*a*, the head 4 of the shaft 4*a* being stopped at the one side of coincident walls of the thereby assembled suspension means portion 2 and third housing portion 3, whilst the threaded end of the shaft 4*a* being screwed by means of nut 6, which is being stopped at the other side of coincident walls of portions 2 and 3.

The third housing portion 3 is thus rotatably connected to the suspension means portion 2 which is in turn fixedly connected to the main housing portion 1. Such rotatable connection allows, following mounting of the flat surface 3*a* onto the windscreen, for the rotation of the assembly of the first housing portion 1 and suspension means portion 2 relative to the fixedly mounted onto the windscreen third housing portion 3, so as to bring the device in a horizontal orientation prior to tightening the nut 6 by means of which the third housing portion eventually becomes fixedly connected to the assembly of housing portions 1 and 2. The abovementioned third housing portion might also be alternatively adhered onto the fixed assembly of the main housing portion 1 and suspension means portion 2 in a way such as to allow rotation of the same, not only with respect to the horizontal, but also with respect to the vertical direction.

It must herein be noted that the invention was presented by reference to illustrative, preferred but not confining embodiments. Thus any change or amendment is, if not constituting a new inventive step, considered part of the scope and aims of the present invention.

What is claimed is:

1. Device for warning drivers of automobiles of excessive speed of turning around a curve, so that they may be alerted in taking remedial measures, comprising sensing means including an arrangement of mercury switches, each one of said switches comprising a cylindrical tube within which is freely reciprocatingly moving a mercury bulb and alarm audio and/or visual signal producing means activated by said switches, the device being characterized by that:

it is an autonomous, self-powered, compact device with said sensing means and said audio and/or visual signal producing means being located within one single main housing portion (1) including a rear cavity (12*a*) for the installation of battery means (12) for providing an independent energy supply for operation of the device and including closure means of a frontal panel surface (1*a*) extending into a perpendicularly projecting basement (1*b*);

said sensing means comprising two, alternatively activated and differentially calibrated, pairs of mercury switches, each said pair comprising two oppositely inclined mercury switches for monitoring right and left turns of the vehicle, wherein a first pair of said pairs of mercury switches (18,19) is adapted for use in conditions of dry road surface by calibration of said mercury switches (18,19) at a predetermined value of inclination and a second pair of said pairs of mercury switches (20,21) is adapted for use in conditions of wet road surface by calibration of said mercury switches (20,21) at a different predetermined value of inclination, each one of said mercury switches being fixedly mounted within a lateral cavity of cylindrical carrier means (18*a*, 19*a*, 20*a*, 21*a*) respectively, said cylindrical carrier means (18*a*, 19*a*, 20*a*, 21*a*) respectively extending into rotatable knobs (18*b*, 19*b*, 20*b*, 21*b*), and said device being accompanied with a calibration device for selectively adjusting response sensitivity of each one of said mercury switches (18, 19, 20, 21) into corresponding combination of performance characteristics of different vehicles and particular driving habits and skills of individual drivers.

2. Device for warning drivers of automobiles of excessive speed of turning around a curve, as claimed in above claim 1, characterized by that the alternative activation of said first pair of mercury switches (18,19) or said second pair of mercury switches (20,21) is carried out by means of a manually operated switch with an operation lever (9) on said frontal panel surface (1*a*) and a switch box (9*a*) at the rear of said frontal panel surface (1*a*).

3. Device for warning drivers of automobiles of excessive speed of turning around a curve, as claimed in above claim 1, characterized by that the alternative activation of said first pair of mercury switches (18,19) or said second pair of mercury switches (20,21) is carried out automatically upon changing of conditions of the road surface in response to activation of the windscreen wipers of the vehicle.

4. Device for warning drivers of automobiles of excessive speed of turning around a curve, as claimed in above claim 1, wherein upon said frontal panel surface (1*a*) are located said switch (9) used in the alternative activation of said first pair of mercury switches (18,19) or said second pair of mercury switches (20,21), a switch (10) used to set the device on or off and said rotatable knobs (18*b*, 19*b*, 20*b*, 21*b*) being used in the calibration procedure of said mercury switches, said knobs (18*b*, 19*b*, 20*b*, 21*b*) correspondingly extending to said cylindrical carrier means (18*a*, 19*a*, 20*a*, 21*a*) with said mercury switches (18, 19, 20, 21) at the rear of said frontal panel surface (1*a*) and wherein upon said perpendicularly projecting basement (1b) of said frontal panel surface is located a rectangular basement (28) onto which are mounted and wired said alarm audio signal producing means (15) sitting onto a vibration absorbing elastic plate (38), a capacitor (22), a mercury switch (23) mounted onto a vertically oriented cylindrical carrier (24) adapted to operate so as to cut off possible activation of anyone of said mercury switches (18, 19, 20, 21) of said sensing means in response to erroneous sensing of bumps or holes in the road and a pair of opposing conductive plates (13) extending through openings (14) of said main housing portion (1) on either end of said rear cavity (12a) thereof for the installation of battery means (12) for providing an independent energy supply for operation of the device.

5. Device for warning drivers of automobiles of excessive speed of turning around a curve, as claimed in above claim 1, wherein said calibration device for selectively adjusting response sensitivity of each one of said mercury switches (18, 19, 20, 21) into corresponding combination of performance characteristics of different vehicles and particular driving habits and skills of individual drivers comprises a vertically oriented surface (32) adapted to receive a circularly marked scale (33a) of degrees, a table (33) whereupon is mounted the device to be calibrated extending perpendicularly from said vertically oriented surface (32), said table (33) being fixedly mounted onto said vertically oriented surface (32) by means of a bolt and nut assembly (34,35), a leveling means (31a) located onto a body (31) extending at the bottom of said vertically oriented surface (32), the calibration device (36) being mounted by means of a pair of legs (30) at the bottom of said vertically oriented surface (32) and of a leg (29) provided at the bottom of said body (31) of the leveling means (31a), said legs being adjustable to obtain optimum level mounting of the calibration device.

6. Device for warning drivers of automobiles of excessive speed of turning around a curve, as claimed in above claim 1, wherein the device is mounted onto the driving panel and even embodied into a selected location thereof.

7. Device for warning drivers of automobiles of excessive speed of turning around a curve, as claimed in above claim 1, wherein the device is mounted onto the windscreen of the vehicle and for this purpose it further includes a suspension means portion (2) of said main housing portion (1), said suspension means (2) having a configuration such as to grip said main housing portion (1) and lock onto the same to form a fixed assembly through engagement of an angular front end surface (2a) and a rear hook (27) of said suspension means portion (2) onto corresponding angular recessions (1c) on the front surface and recession (26) at the rear bottom surface of said main housing portion (1), a third housing portion (3) being rotatably connected to said suspension means portion (2) and fixedly mounted onto the windscreen, wherein rotation of the assembly of said first housing portion (1) and said suspension means portion (2) in a horizontal and vertical direction relative to the fixedly mounted onto the windscreen said third housing portion (3) allows bringing the device in a horizontal orientation prior to fixedly connecting and locking said third housing portion (3) onto said suspension means portion (2).

* * * * *